(No Model.) 2 Sheets—Sheet 1.
P. SCANDRACOF & I. DIMOVICH.
SEED DRILL.
No. 488,775. Patented Dec. 27, 1892.
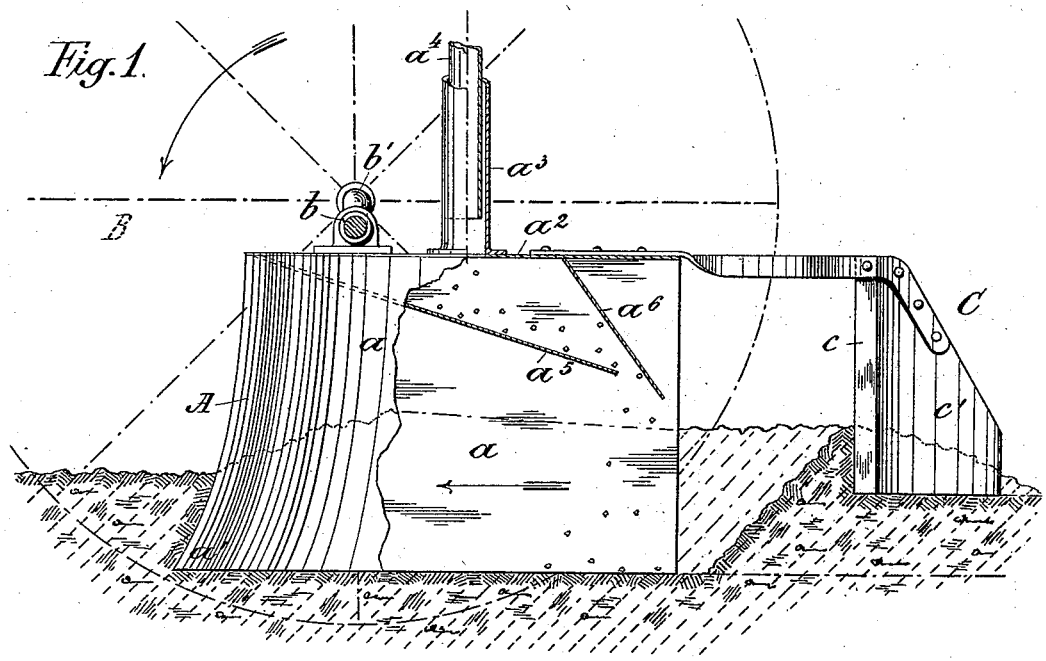
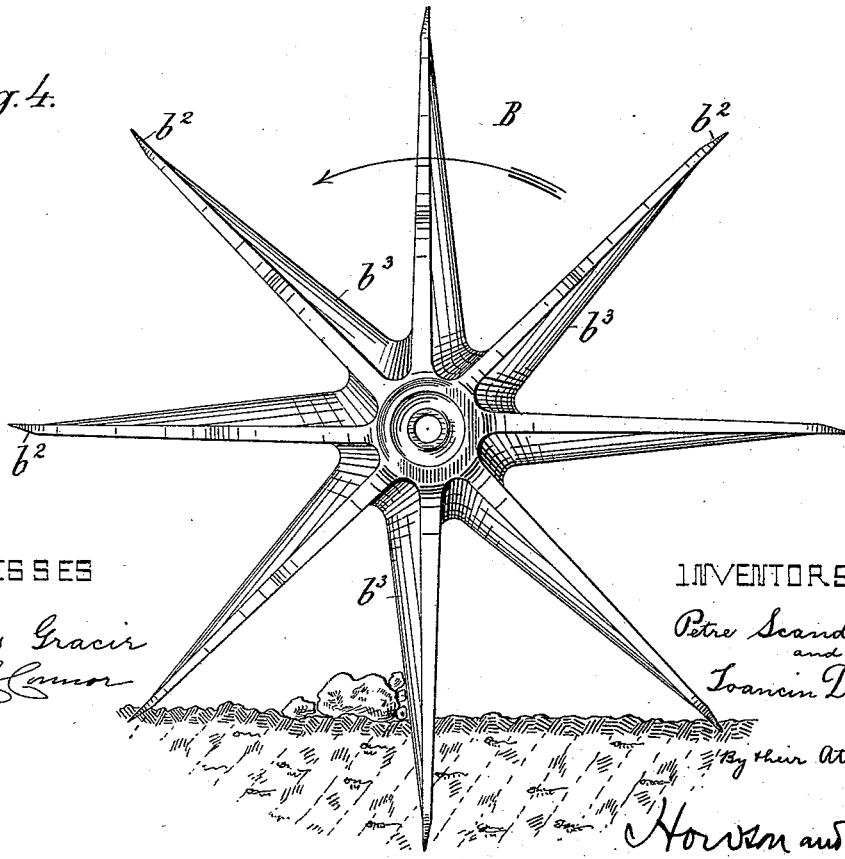
WITNESSES
James Gracir
S. C. Connor
INVENTORS
Petre Scandracof
and
Ioancin Dimovich
By their Attorneys
Howson and Howson
THE NORRIS PETERS CO., PHOTO-LITHO., WASHINGTON, D. C.

(No Model.) 2 Sheets—Sheet 2.
P. SCANDRACOF & I. DIMOVICH.
SEED DRILL.
No. 488,775. Patented Dec. 27, 1892.
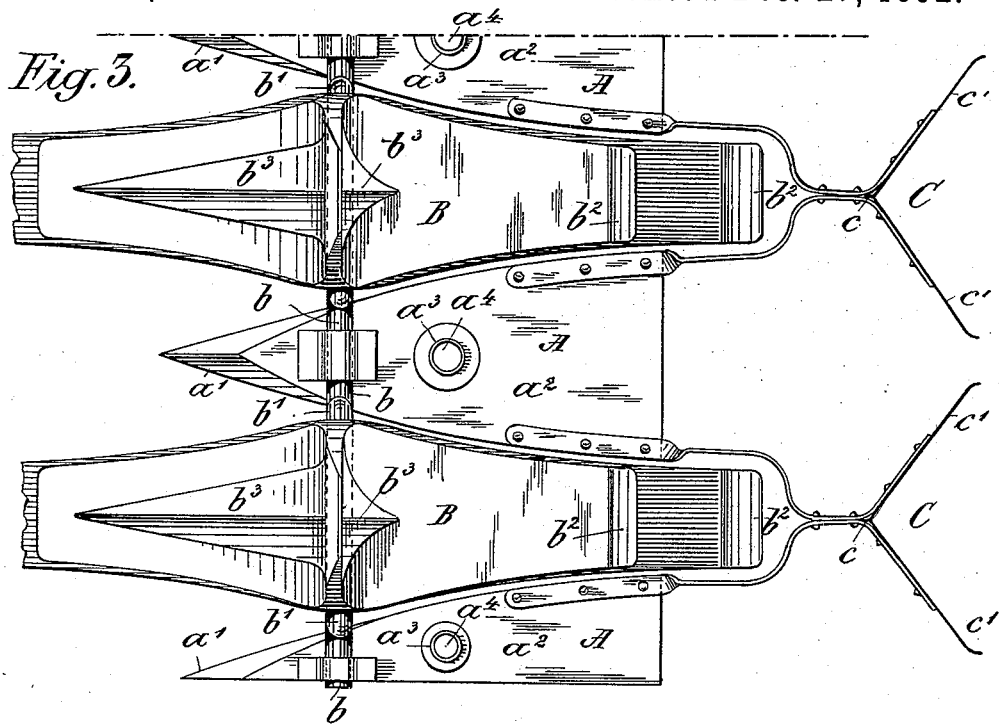
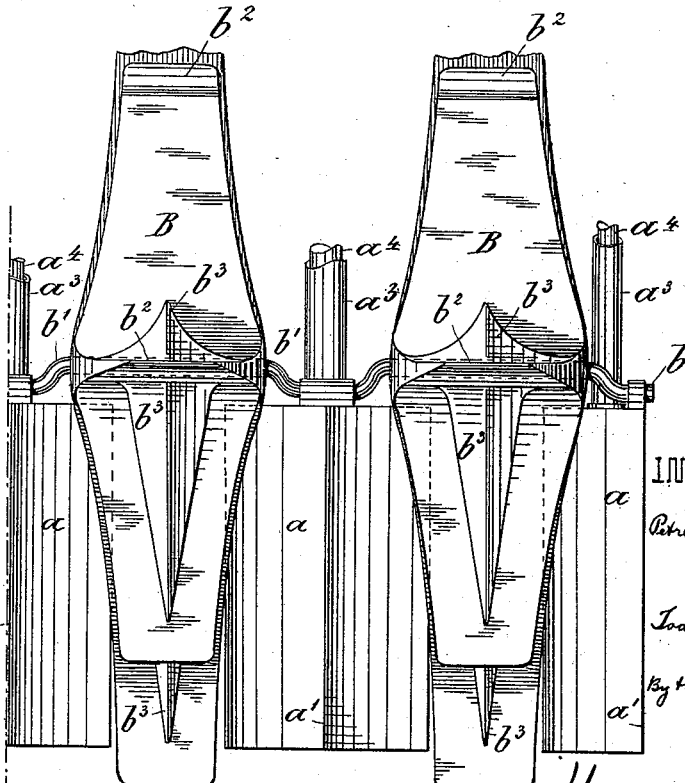

UNITED STATES PATENT OFFICE.

PETRE SCANDRACOF AND IVANCIN DIMOVICH, OF BRAHILOV, ROUMANIA.

SEED-DRILL.

SPECIFICATION forming part of Letters Patent No. 488,775, dated December 27, 1892.

Application filed February 13, 1892. Serial No. 421,487. (No model.)

*To all whom it may concern:*

Be it known that we, PETRE SCANDRACOF and IVANCIN DIMOVICH, subjects of the King of Roumania, and residents of Brahilov, in the Kingdom of Roumania, have invented certain new and useful Improvements in and Relating to Seed-Drills, of which the following is a specification.

Our invention relates to improvements in seed drills and has for its object to enable the sowing to be effected directly in the ground which has been plowed only once and to advance the work subsequently to be done to such an extent that any further operation by means of another implement becomes superfluous.

The operations which the drill constructed according to the present invention has to carry out, include the plowing of the seed furrow, the reduction and loosening of the earth surrounding the seed furrow, the ejection of the seed corn and the closing of the seed furrow.

In the accompanying drawings, Figure 1 is a side elevation partly in section showing those parts of a seed drill which constitute the subject matter of the present invention. Fig. 2 is a front elevation thereof; and Fig. 3 is a plan; Fig. 4 is a detached view of a detail.

For plowing the seed furrow and ejecting the seed corn we employ drill plows A which as shown in the drawings bear resemblance to the front part of a smoothing iron or to the bow of a ram ship. They consist of two cheek plates $a$ $a$ converging at an acute angle to form a common concave edge $a'$ extending forwardly, such cheek plates being also sharpened at their lower edges. We make the drill plow open below and at the rear end and cover it at the top by a plate $a^2$ provided with an aperture and carrying a tube $a^3$ into which extends the tube $a^4$ conducting the seed corn admitted in the usual manner. Somewhat below the cover plate $a^2$ is arranged a distributing plate $a^5$ extending downwardly to the rear at a slight inclination, behind which we provide a second plate $a^6$ also extending downwardly to the rear but at a much greater inclination in order to obviate the irregular strewing of the grain falling from the tube $a^3$ upon the first plate $a^5$ and cause these grains to drop through the space between the rear edge of this plate $a^5$ and the second plate $a^6$ into the furrow cut by the drill plow.

For reducing and loosening the earth surrounding the seed furrow walking or rimless wheels B are arranged loosely upon the upwardly entending bends or cranks $b'$ of a rod or axle $b$ placed across the drill plows A. The wheels are so arranged in the spaces between the drill plows and are of such a shape that they can turn freely upon their axle without being hindered by the drill plows. The length of the teeth of the wheels is such that in their rotary movement they will touch the earth at a short distance in front of the points of the drill plows and that when they extend perpendicularly downward they will not reach beyond the depth to which the ground was loosened in the preceding plowing. The teeth are sharpened rearwardly at the ends as shown at $b^2$ and are provided at the side with a sharpened strengthening rib $b^3$ which when the teeth leave the ground will crush any large clods which may occur, as indicated in Fig. 4. The rod or axle $b$ carrying the wheels B can also be made to turn upon its longitudinal axis and to be fixed in any position. This permits the bends or cranks $b'$ carrying the wheels, to be lowered, and the depth of penetration of the spokes to be increased. The arrangement of the rimless wheels upon the bends or cranks of the aforesaid rod $b$ is advantageous but not essential. The rod or axle may also be simply straight in which case the wheels cannot be adjusted deeper relatively to the drill plows.

In order to close the seed furrows cut by the drill plows we arrange behind these plows and alternating therewith devices or coverers C connected with such plows in a suitable manner so as not to prevent the turning of the wheels. Each of these coverers or devices for closing the furrows consists of a vertical knife $c$, from the two sides of which protrude perpendicular vanes $c'$ inclined to the rear and sidewise and extending close to the center lines of the drill plows; the lower edges of these vanes are in a horizontal plane and their height decreases from the top of said knives to the rear as shown. The neighboring ends of the said vanes $c'$ being in rear may also be connected with each other so that all the devices for closing the furrows form a single rigid piece, but this is not advantageous.

The drill plows A together with the rod or axle $b$ carrying the wheels B and the devices C for closing the furrows may be adjustably attached to the machine or carriage frame in any known manner for enabling the various depths of ground to be treated. But as neither the frame of the machine or carriage nor the connection thereof with the working parts herein described forms a part of the present invention we shall not herein describe these details.

The operation of the improved seed drill is as follows: In the forward movement of the machine in the field which has only once been previously plowed, the drill plows A cut furrows of a depth determined by the adjustment of the parts of the machine and of a width equal to the greatest width of the drill plows. At the same time the seed corn drops from the tube $a^3$ upon the distributing plate $a^5$ and thence into the seed furrow, an irregular strewing of the seed corn being prevented by the second plate $a^6$ so that the seed corn will be distributed uniformly over the seed furrow. When the machine is moved forward the wheels B are set in motion and as their spokes enter the ground a short distance before the points of the drill plows they prevent the earth being accumulated too much in front of the drill plows and being carried away by them, inasmuch as they hold back the parts lying between the drill plows. Accordingly in the forward movement of the machine the earth is as it were forced through the spaces between the drill plows A and is thus crushed and reduced, ridges being formed between the seed furrows. The sharpened strengthening ribs $b^3$ on the teeth or spokes co-operate to this end in the removal of said teeth or spokes from the ground as indicated in Fig. 4. In the middle of these ridges pass the coverers or devices C for closing the furrows. In following the drill plows these coverers divide the ridges by their cutting edge $c$ and by means of their vanes $c'$ push the earth of the ridges into the furrows thus covering and protecting the seed grains, the excessive earth falling over the upper edges of the aforesaid vanes to the rear. After the described machine has been employed a further treatment of the ground by other implements becomes superfluous and its use need only be preceded by a single plowing. A second plowing and rolling and harrowing are unnecessary.

The drill plows at the two ends of the machine may be of such a form that they constitute merely one half of one of the drill plows in the middle as shown in Fig. 3. These end plows have then only admitted to them half the quantity of the seed corn fed to those situated in the middle.

We claim as our invention:—

1. In seed drills, the combination of hollow drill plows A having a cutting edge $a'$ in front, and widened to the rear, open below and behind and provided with an inlet at the top, with a plate $a^5$ below the said opening inclined downward toward the rear and a second plate $a^6$ inclined downward to the rear at a greater degree than the first plate, all substantially as and for the purposes set forth.

2. In seed drills the combination of drill plows with walking wheels B having sharpened teeth and sharpened ribs $b^3$ the teeth adapted to enter the ground just ahead of the plows, all substantially as and for the purpose set forth.

3. In seed drills, the combination of drill plows with devices C for closing the furrows, the said devices being provided with a perpendicular cutting edge $c$ and perpendicular vanes $c'$ extending from this cutting edge to the rear and sidewise, all substantially as and for the purposes set forth.

4. In seed drills, the combination of drill plows, with walking wheels at the sides thereof, the said teeth adapted to carry away the earth in front of the plows and facilitate the crushing of the same.

5. In seed drills, the combination of drill plows with walking wheels at the sides thereof and coverers C having a front cutting edge and flaring sides, all substantially as and for the purposes set forth.

In testimony whereof we have affixed our signatures in presence of two witnesses.

PETRE SCANDRACOF.
IVANCIN DIMOVICH.

Witnesses:
T. G. HAWLY,
E. G. J. MOELLER.